Sept. 15, 1959  H. HILFIKER ET AL  2,904,654
REMOTE CONTROL SWITCHES FOR DISTRIBUTION BOARDS
Filed May 10, 1955  5 Sheets-Sheet 1
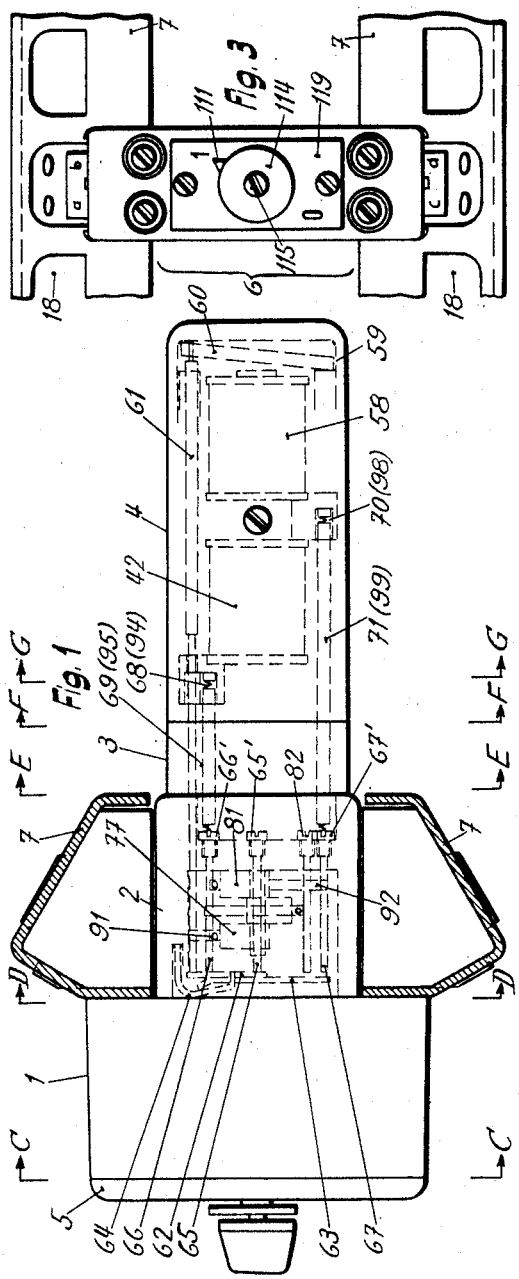
INVENTOR.
Hans Hilfiker
Albert Schreiber
BY
Michael S. Striker
agt.

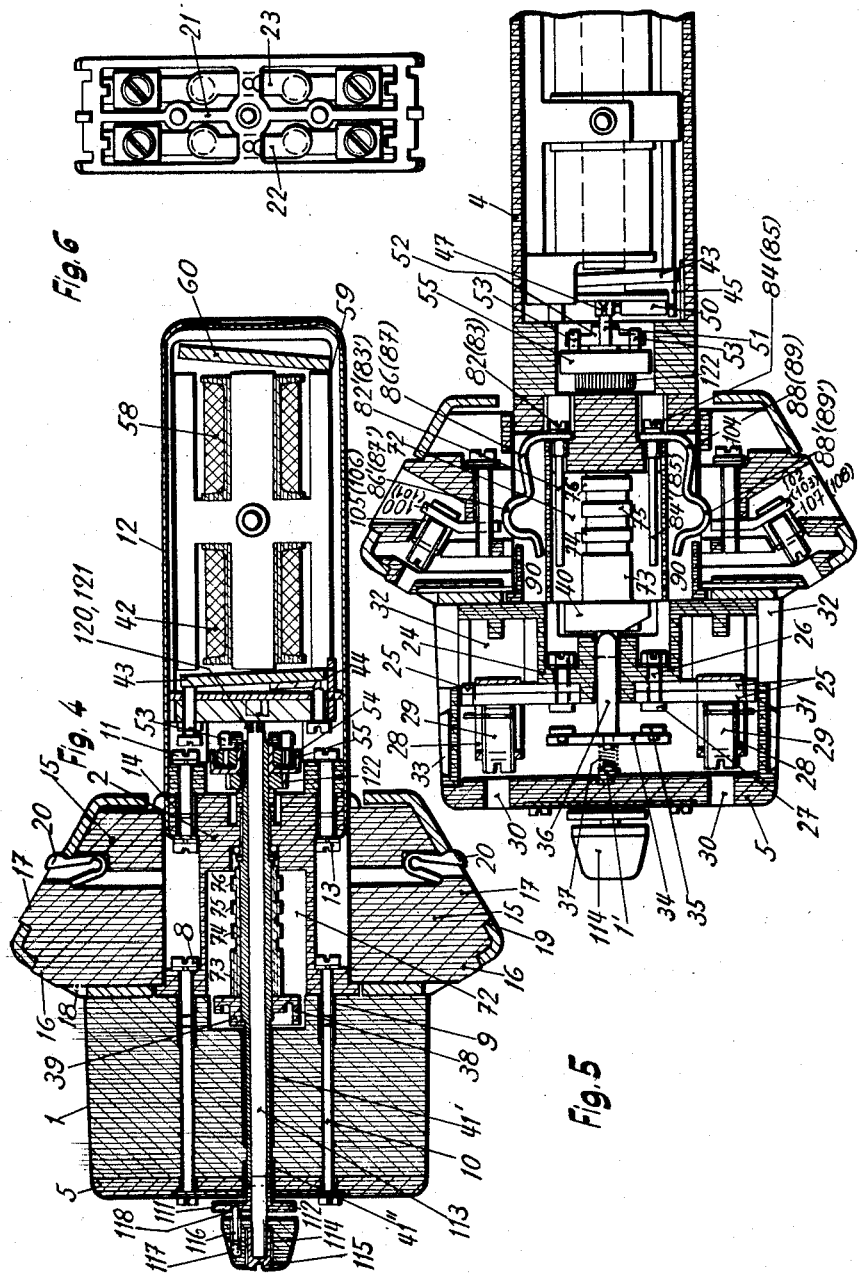

Sept. 15, 1959     H. HILFIKER ET AL     2,904,654
REMOTE CONTROL SWITCHES FOR DISTRIBUTION BOARDS
Filed May 10, 1955     5 Sheets-Sheet 3
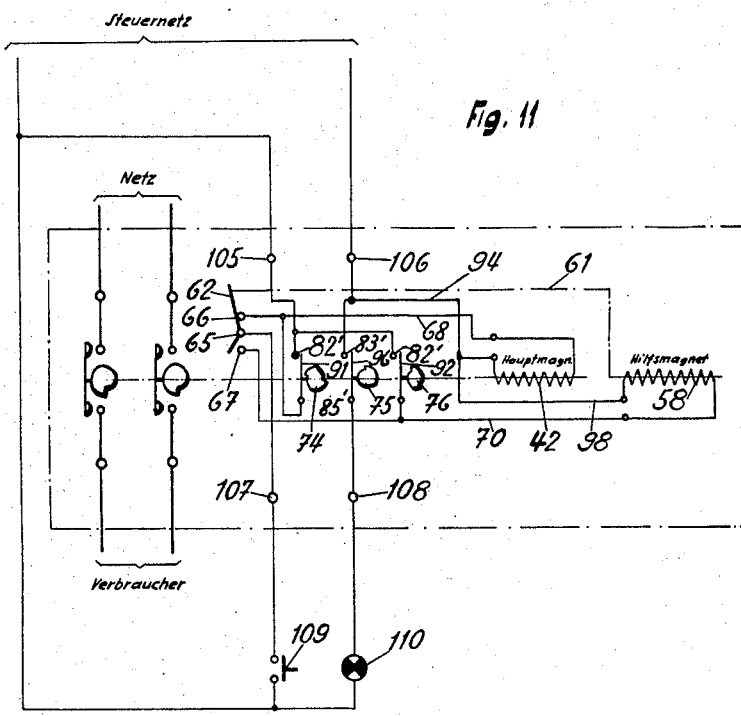
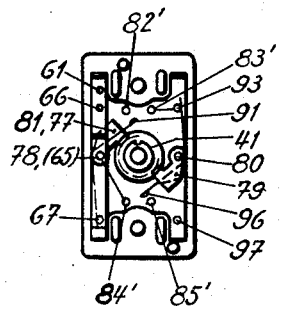
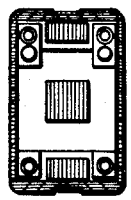
INVENTOR.
Hans Hilfiker
BY Albert Schreiber Sept. 15, 1959   H. HILFIKER ET AL   2,904,654
REMOTE CONTROL SWITCHES FOR DISTRIBUTION BOARDS
Filed May 10, 1955   5 Sheets-Sheet 4

Inventors:
Hans Hilfiker and
Albert Schreiber
by: Michael S. Striker
Attorney

Sept. 15, 1959   H. HILFIKER ET AL   2,904,654
REMOTE CONTROL SWITCHES FOR DISTRIBUTION BOARDS
Filed May 10, 1955   5 Sheets-Sheet 5

Inventors:
Hans Hilfiker and
Albert Schreiber
by:
Michael S. Striker
Attorney

United States Patent Office 2,904,654
Patented Sept. 15, 1959

2,904,654

REMOTE CONTROL SWITCHES FOR DISTRIBUTION BOARDS

Hans Hilfiker, Kilchberg, and Albert Schreiber, Zurich, Switzerland

Application May 10, 1955, Serial No. 507,383

Claims priority, application Switzerland May 11, 1954

9 Claims. (Cl. 200—87)

This invention relates to a remote-controlled electric switch having an actuating shaft extending from the front plate to the back of the switch casing, with electric driving means for the shaft. The switch carries a cam drum controlling its movable contacts closing the working current circuit. The switch carries further a camshaft acting through pawls on the movable contacts, closing and opening the branch circuits of the control circuit. The switching elements and the connections for the working current circuit being arranged in the front part of the casing, while the controlling elements and the connections for the working current circuit are arranged in a part of the casing immediately adjacent to the front part thereof and the electrical driving means acting on the rear end of the switch shaft are located in the rearmost part of such casing.

By arranging the elements controlling the working circuit, those controlling the branch circuits of the switch controlling circuit, and the electrical driving means of the switch actuating shaft next to each other and spaced in axial direction, it is possible to make the width of the casing of the electrical remote-controlled switch as well as the other, overall dimensions thereof, very small, and to adapt the said remote controlled switch in form and dimensions exactly to the form and dimensions of other terminal elements incorporated in the same distribution board. In this way the remote-controlled switch can be installed on a connection bar of a distribution board in the place of one of the other terminal elements, and will not require more space in width and height, than such a terminal element. The fact that the casing of the remote-controlled switch is longer or deeper than the casing of the other terminal elements is of no further importance, since there is usually sufficient space available behind the connection bars of such a distribution board. The adaption of the shape or form of the front part of the casing of such a remote-controlled switch to the shape or form of the casing of such a terminal further enables the connections for the conductors of the working circuit on the remote-controlled switch to be arranged in the same manner and in the same places as in such terminals. This allows a considerable and most desirable simplification of the wiring connections of such a distribution board.

The accompanying drawing represents an example of a preferred form or embodiment of the invention.

Fig. 1 is a partly sectioned side elevation of such a remote-controlled electric switch;

Fig. 2 is a partial plane view thereof;

Fig. 3 is a partial front elevation thereof;

Fig. 4 is a section along the line A—A of Fig. 2;

Fig. 5 is a section along the line B—B of Fig. 2;

Fig. 6 is a front elevation (with the front plate removed) along the line C—C of Fig. 1;

Fig. 7 is a front elevation of the remote-controlled switch (with the whole front part removed) i.e. a view along the line D—D of Fig. 1;

Fig. 8 is a front elevation of the rear part of the switch along the line E—E of Fig. 1;

Fig. 10 is a section along the line G—G of Fig. 1;

Fig. 11 represents the circuit diagram of the switch;

Figure 12:
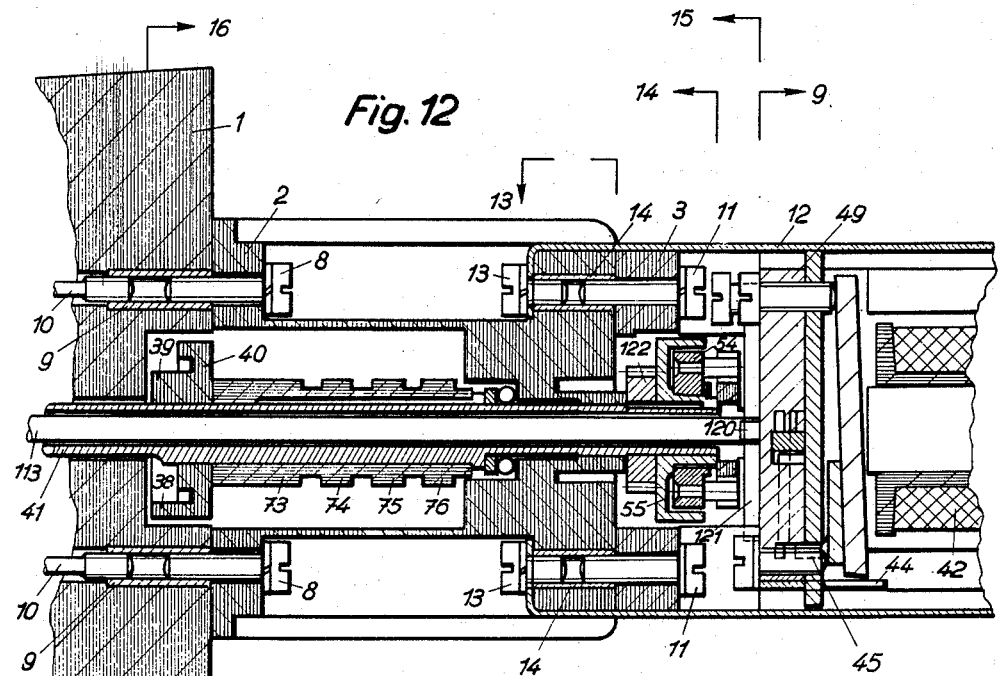
Fig. 12 is a section similar to the section of Fig. 4 and showing the intermediate portion of the switch to an enlarged scale.
Figure 13:
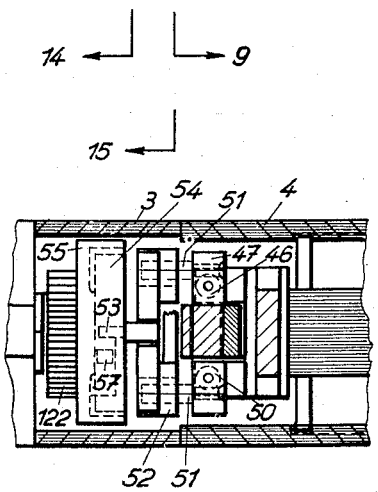
Figs. 13—16 are sections taken respectively along the lines 13—13, 14—14, 15—15, and 16—16 of Fig. 12.
Figure 9:
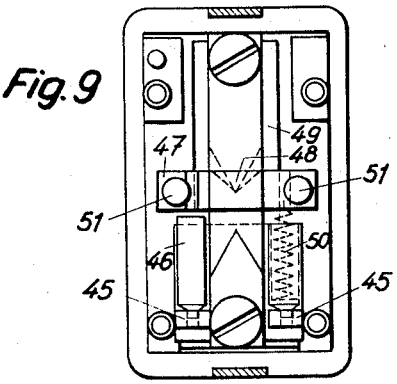
Fig. 9 is a front elevation of the rearmost part of the switch along the line F—F of Fig. 1 drawn to an enlarged scale.
Figure 16:
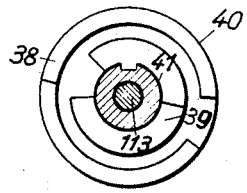

The illustrated remote-controlled electric switch has a casing formed of four successively-arranged parts 1, 2, 3 and 4, made of electrically-insulating material, and the casing is closed by a front plate 5. This casing is arranged to be inserted in a slit 6 of a connection bar 7 the two parts of which defining the slit are of angular form in cross section. The foremost part 1 of this casing corresponds in its external form and overall dimensions exactly to the front part of other terminals used in the particular distribution board for which the particular switch is intended, and the part 2 corresponds to the rear part of such terminal or terminals so that as such a remote-controlled electric switch or a number of such remote-controlled electric switches and terminals can be arranged side by side on such connection bar 7 and can be interchanged against each other as may be required. The part 2 of the casing of such remote-controlled electric switch is of the same width as, but of lesser height than, the corresponding part 1 of the casing. Part 2 is centrally attached to the rear face of part 1 by means of screw bolts 8, which are threaded into tapped bushes 9, into which screws 10 are inserted from the other side for attaching of the front plate 5 is attached to the casing part 1 (Figs. 2 and 12). The part 3 of the casing is centrally attached to the part 2 thereof by means of two screw bolts 11 inserted from the rear. The part 4 of the casing is attached to the rear of the part 3 thereof and held there by means of a bracket 12 fitting into grooves on the upper and lower sides of the parts 3 and 4 (see Figs. 4, 8 and 9). The oppositely bent-up ends of bracket 12 engage in corresponding recesses in the upper and lower sides of the part 2, in which they are held by means of screws 13 inserted in the same tapped bushes 14 which receive the screws 11 joining the casing part 3 to the casing part 2. The casing part 2 is held in the connection bar 7 by a pair of retaining pieces 15 respectively located above and below part 2 and respectively engaging with a projection in grooves provided on the junction faces of the part 2. These retaining pieces 15 are provided at the outer portions thereof, which are shaped to fit the profiles of the parts of the connection bar 7, with lugs 16 and 17 engaging in recesses 18 and 19 in corresponding parts of the connection bar 7, and are held in such parts of the connection bar 7 by spring clips 20. In this manner the retaining pieces 15 are firmly held in the parts of the connection bar 7 and themselves hold the casing of the remote-controlled electric switch laterally unmovable in the connection bar, with the front face of which the parts on the rear side of part 1 projecting beyond the part 2, are in immediate contact.

The inside of the casing part 1 is divided by a partition 21 into two, adjacent but completely separate compartments 22 and 23 (Fig. 6) which are closed in front by the front plate 5. These compartments 22 and 23 contain each, on either side of a centrally situated socket 24, contact plates 25, each consisting of two, superimposed pieces attached by a screw 26 (Fig. 5). The heads 27 of the screws 26 constitute the fixed contacts and are for this purpose provided with a coating of silver.

The parts of the contact plates 25 projecting outwards from the socket 24 carry each a surrounding clamp 28 with a clamping screw 29. For each of these clamping screws 29 the front plate 5 is provided with an access opening 30, the diameter of which is less than that of the corresponding clamping screw 29. The clamping screws 29 can thus be turned by means of a screwdriver inserted through this access opening 30, but cannot be withdrawn through the access openings 30. This ensures safety against accidental contact even when the clamping screws 29 are loose. The clamping screws 29 have on their ends nearest the contact plates 25 a circular groove and the clamping screws 29 on either side of the two compartments 22 and 23 are interconnected in pairs by a screw locking plate 31 engaging in said grooves, thus preventing unintentional withdrawal out of the clamping bow 28; thereby the front plate 5 is also secured against being mechanically stressed by withdrawal of the clamping screws 29. The bow-shaped clamps 28 with their clamping screws 29 are intended to make the connection between the network conductors (not shown) and the contact plates 25. For the insertion of the clamps 28 into the compartments 22 and 23 openings 32 are provided in the upper and lower parts of the rear portion of the casing part 1 and in front of openings 32 inscription plates 33 are provided. Each of the two compartments 22 and 23 contains a bridging contact 34 with two silver contact points 35. Each bridging contact is attached on the front end of a guide rod 36 of square cross section which is axially movable in a guide hole of corresponding cross section passing through the socket 24. The right ends 1 as viewed in Fig. 5, of these guide rods 36 projecting at the back of the socket 24 are pressed, by compression springs 37 acting on the bridging contacts 34 and abutting against a cross piece 1' in the casing part 1, against either of two concentric annular cams 38, 39 set at 180° to each other on the camshaft 40. A portion on one side of the center plane of each of these tail ends of the guide rods 36 is cut away in such manner that only their remaining projecting parts can make contact with either of the cams 38 or 39; in particular, when their cutaway portions are directed inwardly guide rods 36 will make contact with the outside cam 38, and when the cutaway portion is directed outwardly the rods will contact the inside cam 39. The guide rods 36 can be introduced into their guide holes in the socket 24 in either of two positions displaced through 180°. In one position the one guide rod 36 will be actuated by the cam 38 and the other guide rod 36 will be actuated by the other cam 39 on the camshaft 40 in such manner that the two guide rods are moved in the same direction; in the other position both guide rods 36 will be controlled either by cam 38 or 39 on the camshaft 40 in such manner that the two guide rods 36 are caused to move in opposite directions. According to the selected arrangement of the guide rods 36, the remote-controlled switch can act as a switch with two working contacts, two resting contacts, or one changeover contact. The camshaft 40 is placed in a recess in the casing part 1 and is supported in bearings in this part and in the casing part 2.

Figure 14:
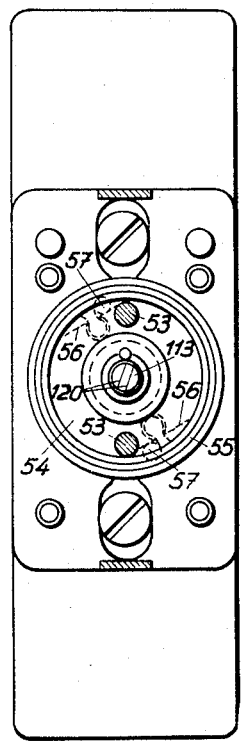
Figure 15:
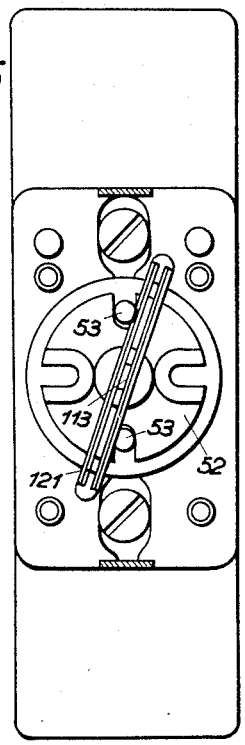

The hollow switch spindle 41 (Figs. 5 and 12) is actuated by an alternating current magnet 42 which is arranged in the front of the casing part 4 and is equipped with a swinging armature 43. This swinging armature 43 is arranged to tilt about a plate 44 fitted in the casing part 4 and has at its lower end a two pronged lever 45 projecting nearly at a right angle towards the casing part 3. Lever 45 acts through a plunger 46 (Fig. 9) on one arm of a two arm rocking lever 47, which is supported on the knife edge bearing 48 of a post 49 fitted in the casing part 4. Between the other arm of the rocking lever 47 and the lever 45, is a return spring 50 which causes the swinging armature 43 of the alternating current magnet 42 to drop and the rocking lever 47 to swing in opposite direction at each current reversal; i.e. with alternating current of 50 cycles the swinging armature performs one hundred oscillations per second. Each of the two arms of the rocking lever 47 carries an inserted pin 51, which pins 51 engage in corresponding holes of a compensating coupling disc 52. Disc 52 is provided with two further holes displaced through 90° in which engage two pins 53 of a driving plate 54 (Figs. 14 and 15), coaxial with the hollow switch spindle 41 and contained in a drum 55 fitted on the hollow switch spindle 41. The circumference of the driving plate 54 is provided with milled recesses 56 each of which accommodates a driving pin 57. The milled recesses 56 are so shaped and act together with pins 57 in the manner of the well known free wheel arrangement that when the driving plate 54 is rotated in one direction the driving pins 57 cause the drum 55 to rotate, but when the driving plate 54 is rotated in the opposite direction the drum 55 will remain at standstill. Therefore, the hollow switch spindle 41 is rotated when the alternating current magnet is energized. Behind the alternating current magnet 42, an auxiliary magnet 58 is arranged in the casing part 4, the armature 60 of which is pivoted at 59 and acts through a pushrod 61 on a contact plate 62 arranged in front in the casing part 2. This contact plate 62 rests on a second contact plate 63 and is loosely connected thereto by the tapering end of a bow spring 64 passing through openings in the overlapping parts of the contact plates 62 and 63. The other end of this bow spring 64 is fitted in a slot in the part 2 of the casing. The bow spring 64 presses the contact plates 62 and 63 into such a position that the contact plate 62 makes contact with the front end of a contact pin 65 and the front end of a second contact pin 66, while the contact plate 63 is lifted off a contact pin 67 (see Fig. 1). The contact pins 65, 66 and 67 are threaded adjacent their heads 65', 66', 67' and they are respectively screwed from the rear side of the casing part 2 into corresponding tapped holes. When the armature 60 of the auxiliary magnet 58 is attracted, the contact plate 62 is tilted into contact with the contact pin 65 and at the same time lifted off the contact pin 66, while the contact plate 63 makes contact with the contact pin 67. The screw head 66' of the contact pin 66 is conductively connected by a helical spring 68, contained in an insulating tube 69, with one terminal of the alternating-current-magnet 42; and the screw head 67' of the contact pin 67 is similarly connected by a helical spring 70, contained in an insulating tube 71, with one terminal of the auxiliary magnet 58.

A central chamber 72 in the casing part 2 open towards the front, contains on the hollow switch spindle 41 passing through chamber of a cam barrel 73 made of electrically insulating material and carrying three cam rings 74, 75, 76. The cam ring 74 is equipped with two cam faces arranged opposite each other and acts on a pawl 77 pivoted on a spindle 78 parallel to the hollow switch spindle 41 (Fig. 7). The cam ring 75 has only one cam which acts on a pawl 79 pivoted on a spindle 80 parallel to the switch spindle 41. The cam ring 76 has again two cams which are shorter than the cams on the cam ring 74 and are so arranged that when the cam barrel 73 is rotated they lag behind the cams of the cam ring 74. The cam ring 76 acts on a pawl 81 which is pivoted on the spindle 78. The pawls 77, 79 and 81 are of electrically insulating material. The casing part 2 further carries, attached by the screws 82, 83, 84 and 85, four contact springs 86, 87, 88 and 89, of steel wire. The contact springs 86 and 87 are respectively located in two grooves 90 provided on the top of the casing part 2 so as to be separated from each other and the contact springs 88 and 89 are similarly fitted in two grooves 90 on the underside of the casing part 2. Near their free ends the contact springs 86, 87, 88 and 89 have respectively semicircular bends 86', 87', 88' and 89' which project out of the grooves. The screws 82, 83, 84 and 85 extend respectively into contact pins 82', 83', 84' and 85' which project parallel to the hollow switch spindle 41, into the chamber 72 of the casing part 2. The pawl 77 contains a contact spring 91, one end of which bears elastically on the contact pin 66, while its other free end is provided with a switch contact point and is pressed against the contact pin 82' when the pawl 77 engages with one of the cams of the cam ring 71. The pawl 81 contains a contact spring 92, one end of which bears elastically on the contact pin 67 while its other end provided with a silver contact point is free in the rest position and is pressed against the contact pin 82' when the pawl 81 makes contact with one of the cams of the cam ring 76. The contact pin 65 is conductively connected with the contact pin 84'. The contact pin 83' is conductively connected with a contact pin 93 arranged symmetrically to the contact pin 66 in the casing part 2, which is connected by a helical spring 94, contained in an insulating tube 95, with the second terminal of the alternating-current magnet 42. The contact pin 93 is in elastic contact with one end of a contact spring 96 fitted in the pawl 79, the other end of spring 96, provided with a silver contact point, is free in the rest position and is pressed against the contact pin 85' when the pawl 79 engages the cam of the cam ring 75. The contact pin 93 is conductively connected with a contact pin 97, arranged symmetrically opposite the contact pin 67 in the part 2 of the casing, is connected by a helical spring 98, contained in an insulating tube 99, with the second terminal of the auxiliary magnet 58.

Each of the retaining pieces 15 has two adjacent chambers in which one of four connecting plates 100, 101, 102 and 103 is attached by means of screws 104. These connecting plates are respectively equipped with a terminal clamp 105, 106, 107 and 108, which are intended for connecting the control network conductors. When the casing part 2 is pushed home between the retaining pieces 15, the bends 86', 87', 88' and 89' are respectively in elastic contact with the inner ends of the connecting plates 100, 101, 102 and 103 in such manner that the summits of the bends 86', 87', 88' and 89' are respectively situated behind the inner ends of the connecting plates 100, 101, 102 and 103. This ensures that the contact springs 86, 87, 88 and 89 not only maintain the electrical connection between the connecting plates 100, 101, 102 and 103 and the contact pins 82', 83', 84' and 85' but also hold the casing part 2 and consequently the entire casing of the remote-controlled switch, elastically between the retaining pieces 15 and thus in the connection bar 7.

The electrical connections of the control current network as well as the manner of action of the remote-controlled switching system will be apparent from the circuit diagram Fig. 11; in which, for better clarity, only the more important reference numbers are used. If a push button switch 109, arranged in the control circuit of the remote-controlled switch, is actuated, a branch of this control circuit is closed, through this push button switch 109, the terminal clamp 107, the connecting plate 102, the contact spring 88, the contact pin 65 connected therewith, the contact plate 62, the contact pin 66, the helical spring 68, the winding of the alternating current magnet 42, the helical spring 94, the screw 83, the contact spring 87, the connecting plate 101 and the terminal clamp 106. The alternating current magnet 42 thus receives current and its swinging armature 43 rotates the hollow switch spindle 41 through the lever 45, the rocking lever 47, the compensating coupling disc 52, the driving plate 54 and the drum 53. When the hollow switch spindle 41 is rotated, one of the cams of the cam ring 74 at once acts on the pawl 77, by which the silvered contact point of the contact spring 91 is pressed against the contact pin 82'. This closes the following circuit; terminal clamp 105, connecting plate 100, contact spring 86, contact pin 82', contact spring 91, helical spring 68, winding of the alternating current magnet 42, helical spring 94, screw 83, contact spring 87, connecting plate 101, terminal clamp 106. This causes the alternating current magnet 42 to remain energized, and its swinging armature 43 to continue active, even if the push button switch 109 is only quite briefly actuated and immediately released, and, in particular, until the pawl 77 is released by the cam 74, after one rotation of the hollow switch spindle 41 through 180°, and the silvered contact point of the contact spring 91 is lifted off the contact pin 82'. This rotation of the switch spindle 41 through 180° corresponds to one switching action of the remote-controlled switch which, once initiated through closing of switch 109, is carried through and completed by the closing of the circuit of the alternating current magnet 42 through the silvered contact point of the contact spring 91 and the contact pin 82'. After the switch spindle 41 has rotated through a few degrees, one of the cams of the cam ring 76 acts on the pawl 81, causing the silvered contact point of the contact spring 92 fitted in this pawl 81 to bear against the contact pin 82' and thus to close the following circuit: terminal clamp 105, connecting plate 100, contact spring 86, contact pin 82', contact spring 92, contact pin 67, helical spring 70, auxiliary magnet winding 58, helical spring 98, screw 83, contact spring 87, connecting plate 101, terminal clamp 106. The auxiliary magnet 58 receives current and its armature 60 is attracted, thereby lifting the contact plate 62 through the pushrod 61 off the contact pin 66 and simultaneously bringing the contact plate 63 into contact with the contact pin 67. This interrupts the circuit of the push button switch 109 between the contact pin 66 and the contact plate 62 and the push button switch 109 thus disconnected during the remaining duration of the switching action from the branch circuit of the alternating current magnet 42. Simultaneously, however, by contact of the contact plate 63 with the contact pin 67, the push button switch 109 is so connected with the circuit of the auxiliary magnet 58, that the armature 60 of the latter cannot drop until the push button switch 109 is released. Only after the armature 60 of the auxiliary magnet 58 has dropped and the remote-controlled switch has completed the opening or closing of the circuit, is it possible to initiate a new switching action of the remote controlled switch by again actuating the push button switch 109. The auxiliary magnet 58 remains energized when the cam of the cam ring 76 releases the pawl 81, since when its armature 60 responds the circuit is closed as follows: terminal clamp 107, connecting plate 102, contact spring 88, contact pin 84', contact pin 65, contact plate 63, contact pin 67, helical spring 70, winding of the auxiliary magnet 58, helical spring 98, contact pin 83', contact spring 87, connecting plate 101, terminal clamp 106. After a half turn of the hollow switch spindle 41 the cam of the cam ring 75 has pressed the pawl 79 outwards, which causes the silvered contact point of the contact spring 96 held in this pawl 79, to be pressed against the contact pin 85'. This closes the circuit of an indicating lamp 110 in the control circuit of the remote-controlled switch, through the terminal clamp 106, connecting plate 101, contact spring 87, contact pin 83', contact spring 96, contact pin 85', contact spring 89, connecting plate 103 and terminal clamp 108. Thus, after the hollow switch spindle 41 has rotated through half a revolution, i.e. after one opening or closing action of the remote-controlled switch, the indicating lamp 110 lights and, since the cam ring 75 has only a single cam, lamp 110 becomes extinguished after a further opening or closing action of the remote-controlled switch. The indicating lamp 110 is suitably placed in direct proximity to the push button switch 109.

The remote-controlled switch described above is further provided with means of manual operation. For this purpose, a driving plate 112 with a pointer 111 is fitted over the end of the hollow switch spindle 41, projecting from the front plate 5. The inside of the hollow switch spindle 41 contains a solid shaft 113 which is longer than the hollow switch spindle 41 and projects beyond the latter at either end. Fixed to the front end of this rotatably supported shaft 113 projecting beyond the hollow switch spindle 41 and the driving plate 112 is knob 114, held by a screw 115 seated on the threaded end in the shaft 113. A blind hole of this knob 114 contains an axially movable driving pin 116, the end of which projecting out of the knob 114 is pressed by a compression spring 117 against the driving plate 112. This driving plate 112 is provided with two ratchet holes 118 displaced through 180° for receiving the end of the driving pin 116. These holes only have sharply defined edges on the forward side in the direction of clockwise rotation, the trailing edges being bevelled or tapered. When the knob 114 is turned clockwise the driving pin 116 held therein actuates the driving plate 112 and with it the hollow switch spindle 41. In the consequent rotation of the cam barrel 73, one of the cams of the cam ring 74 immediately acts on the pawl 77 by which the silvered contact point of the contact spring 91 is pressed against the contact pin 82' and the circuit of the alternating current magnet 42 is closed. The armature 43 of the alternating current magnet 42 responds and effects the further rotation of the hollow switch spindle 41 until the latter has turned through half a circle, i.e. until one opening or closing switch movement has been performed. If the knob 114 is held in any intermediate position, the switching action is thereby not impeded, since in such case the driving pin 116 is pressed over the tapering approach edge of one of the ratchet holes 118 out of such hole. The front plate 5 carries an indicating plate 119 with reference marks for the pointer 111, by which the position of the switch can be observed. If the control current fails, the entire switching operation can be performed manually by means of the knob 114. In this case, two parallel flats 120 on the tail end of the spindle 113 in cooperation with legs of a spring clip 121 pressing against these flats, ensure a mechanical locking action at the end of each switching cycle, i.e. after each rotation through 180°.

For convenience of assembly the hollow switch spindle 41 is subdivided near its front end into a long tool portion 41' and a short stub 41''. The tail portion 41' and the stub 41'' are tongued or rabbeted on their adjacent ends and interlock in such manner as to be rigidly connected without possibility of rotation.

It is equally possible to arrange two or more such remote-controlled switches side by side and operate them simultaneously in which case it is unnecessary for each one thereof to be equipped with the electrical driving means described. For this purpose, each remote-controlled switch is provided on the hollow switch spindle 41 and between the barrel 55 and the casing part 2 with a gearwheel 122. The casing part 3 of all such coupled remote-controlled switches is in such case constructed as a continuous block. This block then contains each two of the gear wheels 122 of the adjacent, remote-controlled switches, intermediate gearwheels (not shown) meshing with such gear wheels 122. From the gearwheel 122 of the particular, remote-controlled switch equipped with electrical driving means, the rotation of the hollow switch spindle 41 is transmitted through the above-mentioned, intermediate gearwheels, to the gearwheels 122 of the other remote-controlled switches not possessing electrical driving means and hence to the hollow switch spindles 41 thereof.

Even when each remote-controlled switch is provided with driving means such intermediate coupling gearwheels can be incorporated in such combined switching systems in order to ensure synchronous action of all such coupled, remote-controlled switch units.

The helical springs 68, 70, 94 and 98, housed in insulating tubes, by which the terminals of the alternating current magnet 42 and the auxiliary magnet 58 are connected with the current carrying or live parts of the arrangement, ensure that in every case a perfect electrical connection will be provided and make a more accurate matching of these connections superfluous. The assembly of the remote-controlled is thereby much facilitated.

The cam tracks 38 and 39 of the camshaft 40 each has a long approach face extending over not more than 180°, followed by a level section which does not influence the position of the bridging contact 34 during further rotation of the hollow switch spindle 41 and which terminates abruptly in a vertical face. This ensures that the closing of the working current circuit is effected very rapidly, while its opening proceeds much more slowly, which is a desirable feature.

The arrangement whereby the clamping screws 29 of the terminal clip 28 for connecting the conductors of the working current network are arranged inside the casing part 1, while the clamping screws of the terminal clips 105, 106, 107 and 108 for connecting the conductors of the control current network are arranged inside the retaining pieces 15, ensures protection of all live parts against accidental contact.

We claim:

1. A remote controlled electric switch, comprising, in combination, an elongated casing having a front portion, a rear portion and an intermediate portion located between said front portion and said rear portion; a front plate formed with an aperture and being mounted at the front end of said front portion of said casing; a switch spindle extending through said aperture in said front plate toward said rear portion of said casing; electrical drive means located in said rear portion of said casing and operatively connected to said switch spindle for moving the same; a pair of contact elements located in said front portion of said casing, said contact elements being movable between an open position in which the working circuit of the switch is opened and a closed position in which said circuit is closed; a cam barrel mounted on said switch spindle and operatively connected to said contact elements for moving the same between said open and closed positions thereof upon movement of said switch spindle by said driving means; contact means located in said intermediate portion of said casing for controlling said electrical drive means; cam means mounted on said spindle and operatively connected to said contact means for controlling the same, said contact means being also located in said intermediate portion of said casing; and connecting means mounted on said front portion of said casing and electrically connected to said pair of contact elements.

2. A remote controlled electric switch as defined in claim 1 in which said cam barrel has at least one cam face having an ascending face portion extending not over 180°, an intermediate face portion extending substantially normal to the cam barrel axis and a descending face portion substantially parallel to said axis.

3. A remote controlled electric switch as defined in claim 2 in which said cam barrel has two concentrically arranged cam faces angularly displaced from each other through 180° and in which said contact elements are constituted by a pair of bridging contacts respectively arranged in two chambers separated from each other, said switch further including a pair of guide rods respectively carrying on one end thereof said bridging contacts, and spring means operatively connected to said guide rods for pressing the other ends thereof against said cam faces of said cam barrel.

4. A remote controlled electric switch as defined in claim 3 and including guide means for guiding said guide rods for movement in longitudinal direction while preventing turning thereof about their longitudinal axis, each of said guide rods may be selectively inserted into the guide means thereof in one of two positions respectively displaced through 180° about the longitudinal axis of said rods and the ends of said guide rods directed toward said cam barrel are cut away in such a manner that said ends will engage one or the other of said cam faces depending on the position in which said guide rods are inserted in their respective guide means.

5. A remote controlled electric switch as defined in claim 1 in which said electrical drive means includes an alternating current magnet, a swinging armature set in motion when said magnet is energized, a rocking lever provided with a return spring, connecting means connecting said swinging armature with said rocking lever to oscillate the latter during the swinging movement of said armature, and uni-directional coupling means connecting said rocking lever to said switch spindle so as to turn the latter consecutively and in one direction during swinging motion of said armature.

6. A remote controlled electric switch as defined in claim 5 in which said driving means for the switch spindle are operated by a control circuit consisting of a number of branch circuits one of which incorporates a push-button switch for temporarily energizing said alternating current magnet, and in which the contact means for controlling said electrical drive means include a plurality of contact springs respectively located in said branch circuits, and a plurality of pawls respectively carrying said contact springs for tilting movement between contact opening and contact closing positions, and in which said cam means for controlling said contact means comprise a plurality of cam rings mounted on the switch spindle for rotation therewith and cooperating respectively with said pawls to move said contact springs carried thereby from said contact opening to said contact closing positions thereof.

7. A remote controlled electric switch as defined in claim 6 in which one of said cam rings has two oppositely arranged cam face means and the pawl cooperating with said one ring carries a contact spring located in the circuit of said alternating current magnet in parallel to said push-button switch, said cam face means being constructed and arranged so that directly after the rotation of the switch spindle is started by energizing said alternating current magnet through closing of said push-button switch, the pawl cooperating with said cam face means is tilted for moving the contact spring thereon to the contact closing position thereof and for holding said contact spring in said closed position until said switch spindle has completed half a revolution and the switching operation is finished.

8. A remote controlled electric switch as defined in claim 7 in which said contact means for controlling said electrical drive means include a change-over switch located in said control circuit, and an auxiliary magnet operatively connected to said change-over switch for operating the same, and in which a second cam ring of said contact means has two oppositely arranged cam face means and the pawl cooperating with the second cam ring carries a contact spring located in the circuit of said auxiliary magnet for closing the circuit of the auxiliary magnet so as to actuate said change-over switch for interrupting the circuit of the alternating-current magnet and thereby deenergizing the same and for simultaneously holding the circuit for the auxiliary magnet closed.

9. A remote controlled electric switch as defined in claim 8 in which a third cam ring of said contact means has a single cam face means and in which the pawl cooperating with said cam face means carries a contact spring arranged in a circuit of an indicator lamp, and said cam face means being constructed so as to close and open the circuit of the indicator lamp for each half revolution of the switch spindle.

References Cited in the file of this patent

UNITED STATES PATENTS

| 2,570,481 | Priesmeyer | Oct. 9, 1951 |
| 2,591,336 | Bordelon | Apr. 1, 1952 |
| 2,658,962 | Bourne | Nov. 10, 1953 |
| 2,690,526 | Morrison | Sept. 28, 1954 |